US006997508B2

(12) United States Patent
Jaaska, Sr.

(10) Patent No.: US 6,997,508 B2
(45) Date of Patent: Feb. 14, 2006

(54) PIVOTABLE REAR SEAT ARMREST WITH INTEGRATED ENTERTAINMENT SYSTEM

(75) Inventor: John P. Jaaska, Sr., Canton, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 0 days.

(21) Appl. No.: 10/828,748

(22) Filed: Apr. 20, 2004

(65) Prior Publication Data

US 2005/0231008 A1 Oct. 20, 2005

(51) Int. Cl.
*A47C 7/62* (2006.01)
(52) U.S. Cl. .......................... 297/188.15; 297/188.19; 297/188.16; 297/188.14; 297/217.3
(58) Field of Classification Search ............ 297/188.2, 297/188.16, 188.17, 188.14, 188.1, 188.04, 297/188.15, 217.3; 348/837; 725/75; 381/86; 455/345; 296/24.34, 37.8, 37.15
See application file for complete search history.

(56) References Cited

U.S. PATENT DOCUMENTS

| | | | | |
|---|---|---|---|---|
| 4,779,923 A | * | 10/1988 | Lang et al. ............... | 312/235.2 |
| 4,946,120 A | * | 8/1990 | Hatcher .................... | 248/183.2 |
| 4,982,996 A | | 1/1991 | Vottero-Fin et al. | |
| 5,000,511 A | * | 3/1991 | Shichijo et al. .......... | 297/188.05 |
| 5,076,524 A | * | 12/1991 | Reh et al. ................. | 248/296.1 |
| 5,161,028 A | | 11/1992 | Kawata et al. | |
| 5,177,616 A | | 1/1993 | Riday | |
| 5,179,447 A | | 1/1993 | Lain | |
| 5,195,709 A | * | 3/1993 | Yasushi .................. | 248/280.11 |
| 5,222,780 A | * | 6/1993 | Reh et al. ............... | 297/188.19 |
| 5,271,590 A | * | 12/1993 | Rosen .................... | 248/222.13 |
| 5,316,369 A | * | 5/1994 | Kanda .................... | 297/188.15 |
| 5,516,191 A | * | 5/1996 | McKee .................. | 297/188.15 |
| 5,547,248 A | * | 8/1996 | Marechal ............... | 297/188.17 |
| 5,556,017 A | * | 9/1996 | Troy ......................... | 224/549 |
| 5,562,331 A | * | 10/1996 | Spykerman et al. ... | 297/188.16 |
| 5,613,732 A | | 3/1997 | Demick | |
| 5,667,179 A | * | 9/1997 | Rosen .................... | 248/278.1 |
| 5,709,360 A | | 1/1998 | Rosen | |
| 5,775,771 A | * | 7/1998 | La Cour et al. ........... | 297/238 |
| 5,853,220 A | * | 12/1998 | Gulich et al. .......... | 297/188.16 |
| 5,865,503 A | | 2/1999 | Shields, Jr. | |
| 6,179,263 B1 | * | 1/2001 | Rosen et al. ............. | 248/278.1 |
| 6,279,977 B1 | | 8/2001 | Chen | |
| 6,547,323 B1 | * | 4/2003 | Aitken et al. ............... | 297/113 |

* cited by examiner

*Primary Examiner*—Peter M. Cuomo
*Assistant Examiner*—Erika Garrett
(74) *Attorney, Agent, or Firm*—Brinks Hofer Gilson & Lione

(57) ABSTRACT

An armrest adapted to be pivotally mounted between a pair of rear vehicle seats includes an elongated base having a first end adapted to be pivotally mounted on a suitable armrest support structure located between the seats, for movement between a deployed position between the seats or in a stowed position defining a further backrest between the seats. A lid covering at least a portion of the base's upper surface is pivotally mounted on the base proximate to its second end, for movement between a closed position and an open position revealing both the upper surface of the base and a video display screen on the underside of the lid. The video display screen, which is preferably itself pivotally supported by the lid, is preferably driven by a video source housed within the base and accessible via the upper surface of the base, as controlled by a rear seat passenger.

21 Claims, 3 Drawing Sheets

PIVOTABLE REAR SEAT ARMREST WITH INTEGRATED ENTERTAINMENT SYSTEM

FIELD OF THE INVENTION

The invention relates to stowable entertainment systems for use by rear-seat passengers of a motor vehicle.

BACKGROUND OF THE INVENTION

Vehicle entertainment systems featuring display screens that may be viewed by rear-seat passengers are becoming increasingly popular. Typically, the system's display screen is deployed from a stowed position within a ceiling-mounted housing by pivoting the video display screen downwardly into the line of sight of the rear-seat passengers. A video signal is then generated either locally within the ceiling-mounted housing or remotely, for example, from a video source housed within the vehicle's forward console, to thereby drive the deployed screen. An infrared transceiver is often disposed on the screen's ceiling-mounted housing to transmit audio signals from the audio source to one or more infrared-receiving headsets and, further, to receive control signals for the screen and/or video source from a rear-occupant-operated remote control unit.

Moreover, such overhead to video display screens are typically pivoted to downwardly about only a single horizontal, cross-vehicle axis, such that screen viewing is optimized only for a single vehicle occupant positioned along the vehicle centerline while further requiring rear seat occupants to look up at the deployed display screen. Further, the typical inability to reposition the deployed display screen about a vertical axis often results in the distraction of a rear seat occupant who is not otherwise watching the video program.

Still further, known ceiling-mounted vehicle entertainment systems sacrifice available occupant headroom, particularly when the video display screen is lowered into the deployed position. Such systems are, therefore, typically utilized in vehicles having a significant amount of available headroom, such as sport utility vehicles and minivans, rather than in vehicles having minimal or low headroom, such as sedans and coupes.

Accordingly, what is needed is a stowable, in-vehicle entertainment system that overcomes the aforesaid deficiencies of the prior art.

SUMMARY OF THE INVENTION

Under the invention, an armrest, adapted to be pivotally mounted on an armrest support disposed between an adjacent pair of rear vehicle seats, includes an elongated base having a frame defining a first end and a second end, an upper surface, and a padded lower surface. The first end of the base is adapted to be pivotally mounted on the armrest support for movement between a lowered, "deployed" position and a raised, "stowed position." The armrest also includes an elongated lid having a frame defining a first end and a second end, a lower surface, and a padded upper surface. The first end of the lid is pivotally mounted on the base proximate to the base's second end, as by a friction hinge, for movement between a closed position, in which the lid overlies at least a portion of the base proximate to the base's second end, and an open position, in which the lid is disposed in a predetermined nonzero angle with respect to the base.

In accordance with an aspect of the invention, the lid includes a lower surface that is at least partially defined by a video display screen. While the invention contemplates supporting the video display screen on the lid's frame in any suitable manner such that the video display screen defines a portion of the lid's lower surface, in an exemplary embodiment, the video display screen is pivotally mounted on the lid frame for movement about a first, generally horizontal axis when the base is in the deployed position. In this manner, the video display screen can be advantageously tilted about the horizontal pivot axis, for example, to improve viewing angles and reduce glare. The video display screen is preferably also supported by the lid's frame for pivoting movement about a second axis generally normal to the first axis and, preferably, lying within a plane defined by the lid frame, so that the video display screen can advantageously be canted towards one of the two rear seat passengers to thereby minimize distraction to the other rear seat passenger.

In a first exemplary embodiment, the lid substantially overlies the entire upper surface of the base when the lid is in the closed position. In a second exemplary embodiment, the lid overlies only a portion of the upper surface of the base, proximate to the second end of the base, when the lid is in the closed position. The second exemplary embodiment further features a padded portion of the base's upper surface proximate to the base's first end that may advantageously be used as an armrest by rear seat passengers, even when the lid is in the open position for viewing the video display screen.

In accordance with another aspect of the invention, the base houses a video source accessible from the upper surface of the base when the lid is pivoted to the open position. Moreover, in an exemplary embodiment, where the video source includes a slot accessible from the upper surface of the base within which to receive electronic media, the video source defines a raised portion of the upper surface of the base, and the lid includes a recessed portion complementary to the raised portion of the upper surface of the base. Preferably, one of the base and lid houses an infrared transmitter for transmitting audio signals to a remote infrared receiver, such as audio headphones or, perhaps, for controlling a remote video source disposed, for example, in the vehicle console. One of the base and lid preferably also houses an infrared receiver for receiving control signals from a remote infrared transmitter.

Thus, the stowable rear seat armrest with integrated entertainment system is readily installed within a given vehicle by swapping out the factory armrest and tapping into surrounding wiring, including those vehicles featuring relatively minimal or low available headroom.

Additional features, benefits, and advantages of the invention will become apparent to those skilled in the art to which the invention relates from the subsequent description of several exemplary embodiments and the appended claims, taken in conjunction with the accompanying Drawings.

BRIEF DESCRIPTION OF THE DRAWINGS

In the Drawings, wherein like reference numerals are used to designate like components in each of the several views, and wherein the relative thickness of certain components has been increased for clarity of illustration.

DETAILED DESCRIPTION OF THE PREFERRED EMBODIMENT

Figure 1:
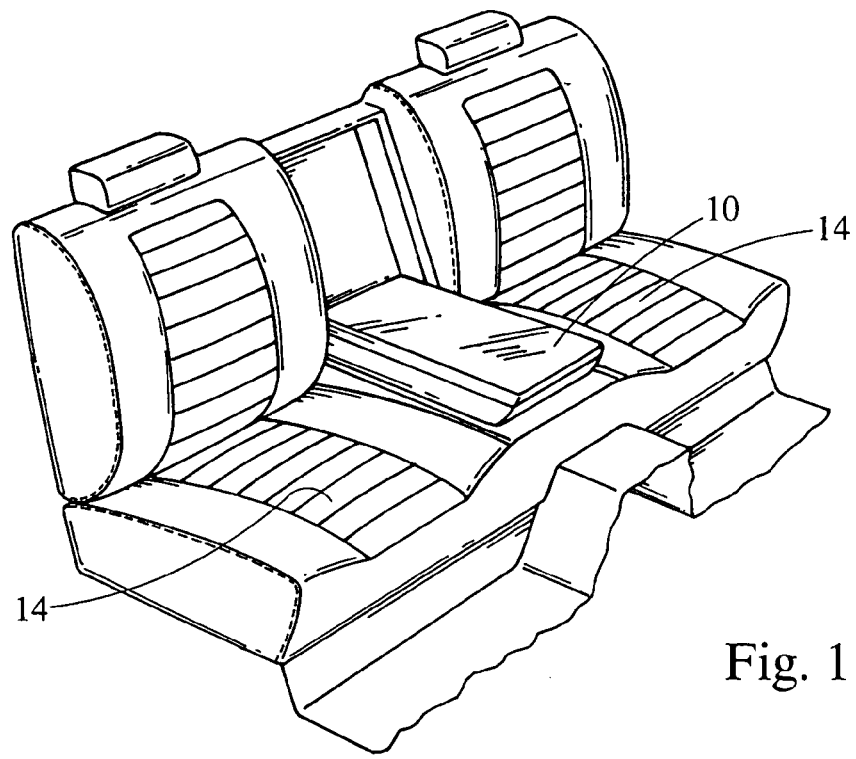
FIG. 1 is a view in perspective of a rear bench seat of a motor vehicle in which a first exemplary pivoting armrest according to the invention is disposed between a pair of seats, for pivoting movement between a raised, "stowed" position and a lowered, "deployed" position.
Figure 2:
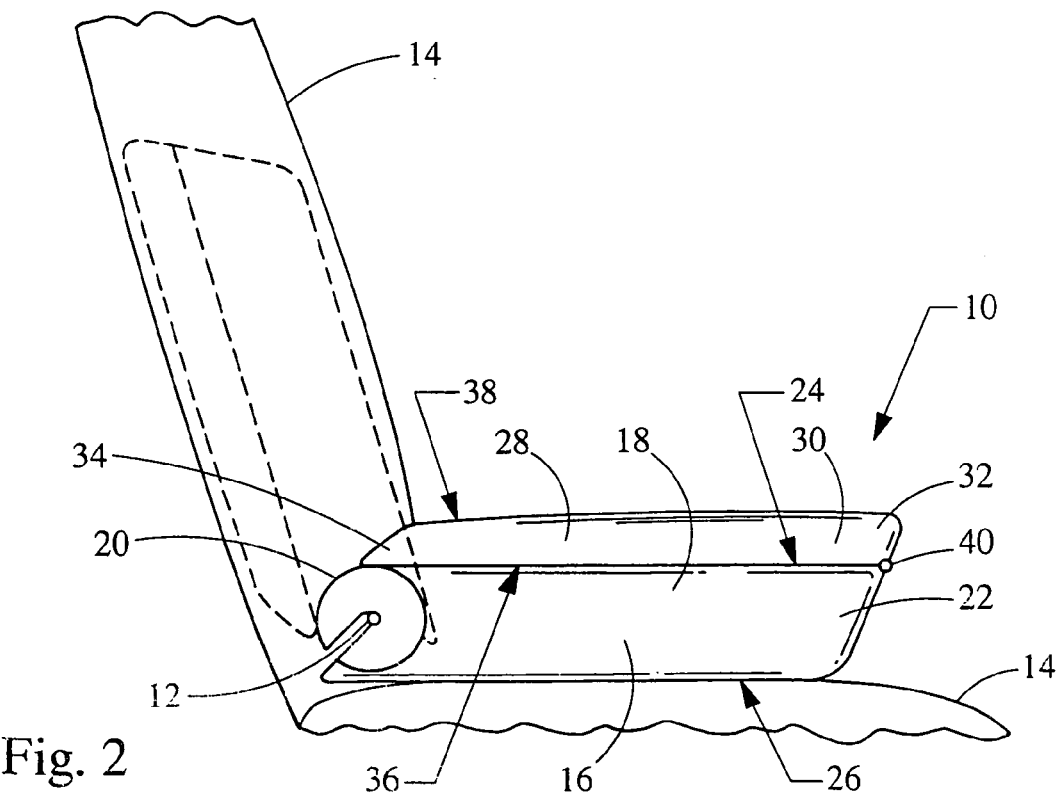
FIG. 2 is sectional view of the rear bench seat, illustrating the relative position of the first armrest in both stowed (dashed lines) and deployed positions (solid lines)

Referring to FIGS. 1 and 2, a first exemplary rear-seat armrest 10 with an integrated entertainment system for a motor vehicle is adapted to be pivotally mounted on an armrest support 12 disposed between an adjacent pair of rear vehicle seats 14, so as to be movable between a raised, "stowed" position.(as illustrated in dashed lines in FIG. 2) and a lowered, "deployed" position (as illustrated both in FIG. 1 and in solid lines in FIG. 2).

As best seen in FIG. 2, the armrest 10 includes an elongated base 16 having a frame 18 defining a first end 20 and a second end 22. The first end 20 of the base 16 is pivotally mounted on the armrest support 12 to permit movement of the armrest 10 between the stowed and deployed positions. While any suitable configuration may be used to achieve the desired pivoting function, in the exemplary embodiment, the first end of the armrest base defines a pair of transversely-aligned slotted cams that receive a transversely-extending pin-shaped armrest support 12, an upper surface 24, and a padded lower surface 26.

Figure 3:
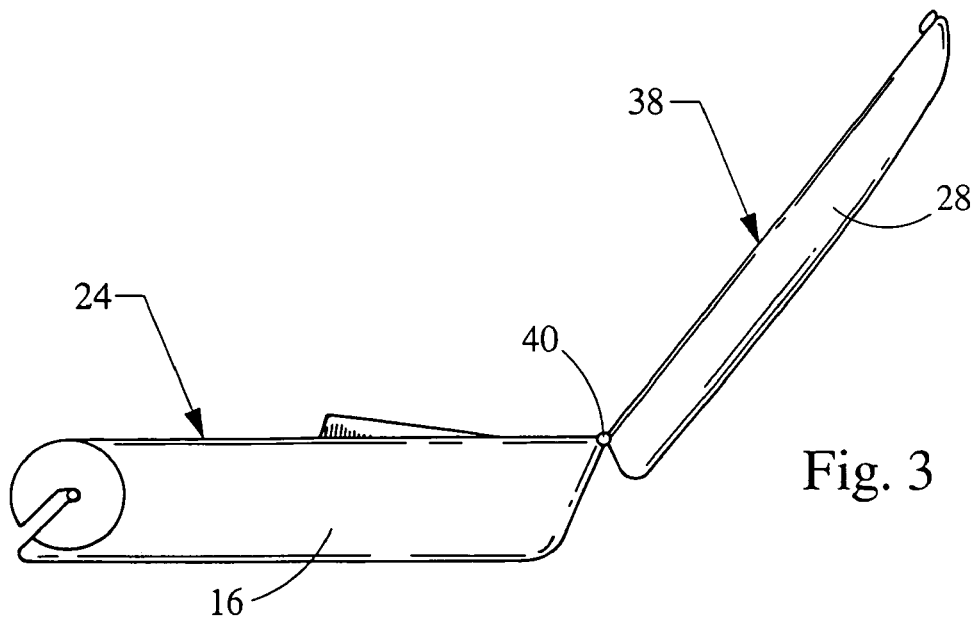
FIG. 3 is an elevation of the deployed first armrest with the lid in the open position.

Referring to FIGS. 2 and 3, the armrest 10 further includes an elongated lid 28 having a frame 30 defining the lid's first and second ends 32,34, a lower lid surface 36, and a padded upper lid surface 38. The first end 32 of the lid 28 is pivotally mounted on the base 16 by a friction hinge 40 proximate to the base's second end 22 for movement about a pivot axis 42 between a closed position as illustrated in FIG. 2, in which the lid 28 overlies substantially all of the upper surface 24 of the base 16, and an open position as illustrated in FIG. 3, in which the lid 28 is disposed in a predetermined nonzero angle with respect to the base. While the invention contemplates any suitable mechanism for limiting the pivoting movement of the lid 28 relative to the base 16, in the first armrest 10, the movement of the lid 28 is limited by engagement of the first end 32 of the lid 28 with the second end 22 of the base 16.

Figure 4:
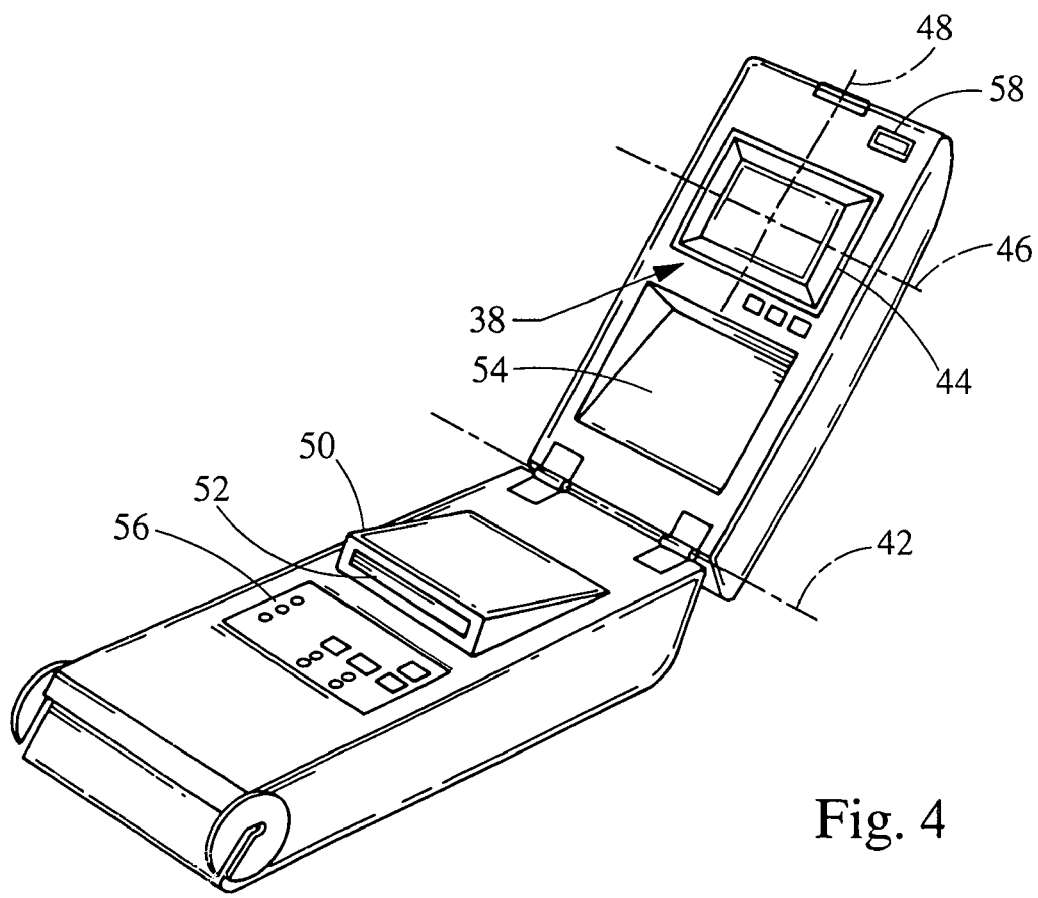
FIG. 4 is a perspective view of the first armrest with the lid in the open position.

As best seen in FIG. 4, the lid 28 includes a lower surface 38 that is at least partially defined by a video display screen 44. While the invention contemplates supporting the video display screen 44 on the lid frame 30 in any suitable manner such that the video display screen 44 defines a portion of the lid's lower surface 38, in the first armrest 10, the video display screen 44 is pivotally mounted on the lid frame 30 for movement about a first, generally horizontal axis 46 when the base 16 is in the deployed position. In this manner, the video display screen 44 can be advantageously tilted about the horizontal pivot axis 46, for example, to improve viewing angles and reduce glare. The video display screen 44 is also supported by the lid's frame 30 for pivoting movement about a second axis 48, generally normal to the first axis 44 and, preferably, lying within a plane defined by the lid frame 30, so that the video display screen 44 can advantageously be canted towards one rear seat occupant to thereby minimize distraction to another rear seat occupant.

In accordance with another aspect of the invention, in the first armrest 50, the base 16 houses a video source 50 accessible from the upper surface 24 of the base 16. As seen in FIG. 4, the video source 50 includes a slot 52, accessible from the base's upper surface, within which to receive electronic media. Because the video source 50 defines a raised portion of the upper surface 24 of the base 16, the lid 28 of the first armrest 50 includes a recessed portion 54 complementary to the raised portion of the upper surface 24 of the base 16. The base 16 further provides a control panel 56 for operating the video source that also includes a pair of headphone jacks. The lid 28 houses an infrared transceiver 58 for transmitting audio signals to a remote infrared receiver (not shown), such as audio headphones or, perhaps, for controlling a remote video source disposed, for example, in the vehicle console, and for receiving control signals from a remote infrared transmitter (not shown).

Figure 5:
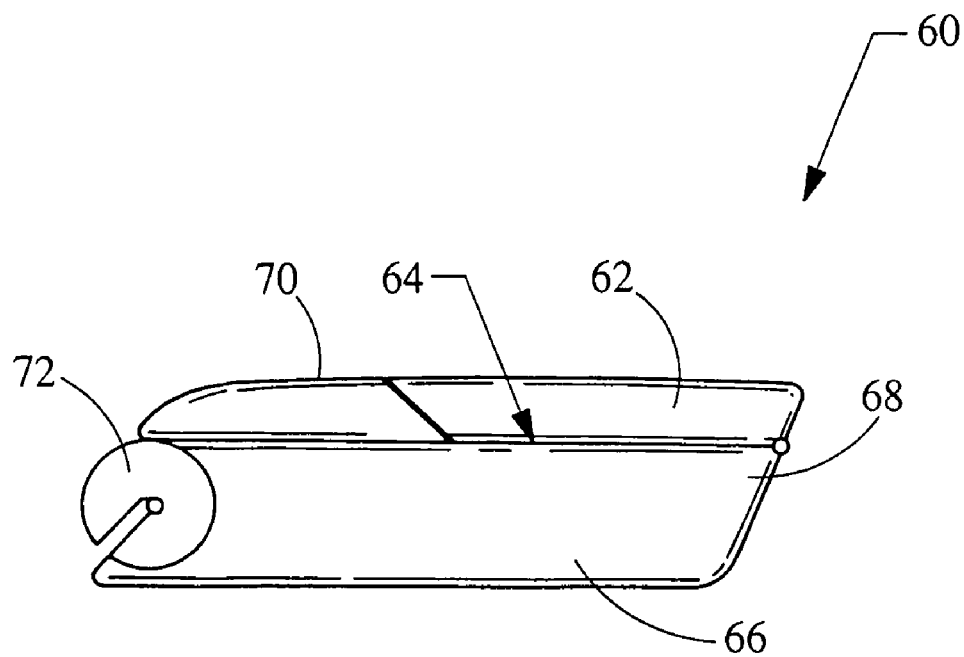
FIG. 5 is an elevation of a deployed second armrest according to the invention, with the lid shown in the closed position.
Figure 6:
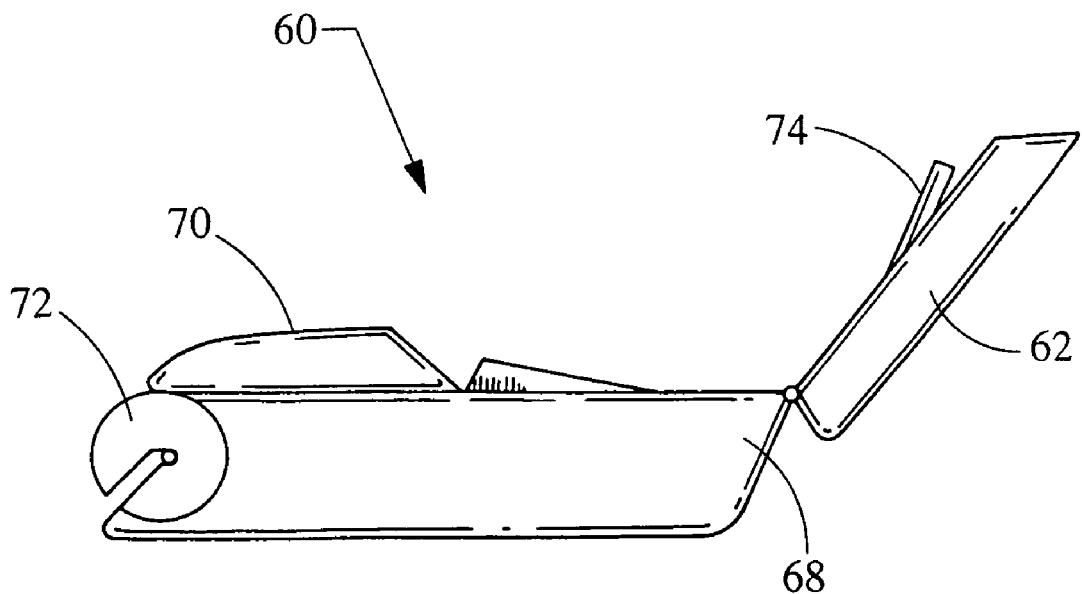
FIG. 6 is an elevation of the deployed second armrest, with the lid shown in the open position.

A second exemplary armrest 60 in accordance with the invention is shown in FIGS. 5 and 6. The second armrest 60 includes a lid 62 which overlies only a portion of the upper surface 64 of the base 66, proximate to the second end 68 of the base 66. The second armrest 60 further features a padded portion 70 of the base's upper surface proximate to the base's first end 72 that advantageously serves as an armrest for rear seat occupants, even when the lid 62 is in the open position for viewing the video display screen 74 as illustrated in FIG. 6.

Referring again to FIG. 6, the video source 76 housed in the base 66 preferably pivots up into the position illustrated in the Figure when the lid 62 is pivoted to the open position, thereby obviating the need for a recess defined in the lid 62, as described above in connection with the first armrest 10.

While the above description constitutes the preferred embodiment, it will be appreciated that the invention is susceptible to modification, variation and change without departing from the proper scope and fair meaning of the subjoined claims. For example, while the invention is described above in connection with a flat panel display, it will be appreciated that the invention contemplates use of any suitable video display screen, including LCD displays, and plasma displays. Similarly, the phrase "video source" is intended to encompass any receiver or player capable of generating viewable images from broadcast signals or a variety of electronic media, both analog and digital, including without limitation DVD's and VCD's.

What is claimed is:

1. An armrest adapted to be pivotally mounted on an armrest support disposed between an adjacent pair of rear vehicle seats, the armrest comprising:
    a elongated base having a frame defining a first end and a second end, an upper surface, and a padded lower surface, wherein the first end of the base is adapted to be pivotally mounted on the armrest support; and
    a elongated lid having a frame defining a first end and a second end, a lower surface, and a padded upper surface, wherein the first end of the lid is pivotally mounted on the base proximate to the second end of the base for movement between a closed position and an open position, the closed position being characterized in that the lower surface of the lid overlies at least a portion of the upper surface of the base proximate to the second end of the base, and the open position being characterized by a predetermined nonzero angle defined between the lower surface of the lid and the upper surface of the base, wherein the lower surface of the lid is defined at least in part by a video display screen.

2. The armrest of claim 1, wherein the lid pivotally supports the video display screen for pivoting movement about a generally-horizontal first screen axis when the lid is in the open position.

3. The armrest of claim 2, wherein the lid further supports the video display screen for pivoting movement about a second screen axis generally normal to the first screen axis when the lid is in the open position.

4. The armrest of claim 1, wherein the lid substantially overlies the entire upper surface of the base.

5. The armrest of claim 1, wherein movement of the lid about the second pivot axis to the open position is limited by engagement of an end portion of the lid, proximate to the first end of the lid, with an end portion of the base, proximate to the second end of the base.

6. The armrest of claim 1, wherein the base houses a video source accessible from the upper surface of the base.

7. The armrest of claim 1, wherein the video source defines a raised portion of the upper surface of the base, and wherein the lid includes a recessed portion complementary to the raised portion of the upper surface of the base.

8. The armrest of claim 6, wherein one of the base and lid houses an infrared transmitter for transmitting audio signals to a remote infrared receiver.

9. The armrest of claim 6, wherein one of the base and lid houses an infrared receiver for receiving control signals from a remote infrared transmitter.

10. An automotive seat assembly comprising:
a pair of rear seats;
an armrest disposed between the pair of rear seats, the armrest including:
an elongated base defining first and second opposing ends, wherein the first end of the base is pivotally mounted between the pair of rear seats; and
an elongated lid defining a first end and a second end, wherein the first end of the lid is pivotally mounted on the base adjacent to the second end of the base for movement between a closed position and an open position, the closed position being characterized in that the lid overlies at least a portion of the base, and the open position being characterized by a predetermined nonzero angle defined between the lid and the base,
wherein the lid includes a video display screen located so as to be viewable when the lid is in the open position.

11. The automotive seat assembly of claim 10, wherein the base houses a video source that is electrically connected to the video display screen.

12. The automotive seat assembly of claim 11, wherein the video source defines a raised portion of the upper surface of the base, and wherein the lid includes a recessed portion complementary to the raised portion of the upper surface of the base.

13. The automotive seat assembly of claim 12, wherein the video source includes an exposed slot adapted to receive electronic media.

14. The automotive seat assembly of claim 10, wherein the lid pivotally supports the video display screen for pivoting movement about a second pivot axis generally parallel to the first pivot axis.

15. The automotive seat assembly of claim 14, wherein the lid further supports the video display screen for pivoting movement about a third pivot axis generally normal to the second pivot axis.

16. The automotive seat assembly of claim 10, wherein movement of the lid about the first pivot axis to the open position is limited by engagement of an end portion of the lid, proximate to the first end of the lid, with an end portion of the base, proximate to the second end of the base.

17. The automotive seat assembly of claim 10, wherein a first portion of the upper surface of the base proximate to the first end of the base is padded.

18. The automotive seat assembly of claim 10, wherein the lower surface of the lid substantially overlies the entire upper surface of the base.

19. The automotive seat assembly of claim 10, wherein one of the base and lid houses an infrared transmitter for transmitting audio signals to a remote infrared receiver.

20. The automotive seat assembly of claim 10, wherein one of the base and lid houses an infrared receiver for receiving control signals from a remote infrared transmitter.

21. The automotive seat assembly of claim 10, wherein the base includes a padded lower surface and the lid includes a padded upper surface.

* * * * *